US008639685B2

(12) United States Patent
Huang et al.

(10) Patent No.: US 8,639,685 B2
(45) Date of Patent: Jan. 28, 2014

(54) JOURNALING ON MOBILE DEVICES

(71) Applicant: Apple Inc., Cupertino, CA (US)

(72) Inventors: Ronald Keryuan Huang, Cupertino, CA (US); Patrick Piemonte, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/681,154

(22) Filed: Nov. 19, 2012

(65) Prior Publication Data
US 2013/0144772 A1 Jun. 6, 2013

Related U.S. Application Data

(63) Continuation of application No. 12/892,913, filed on Sep. 28, 2010, now Pat. No. 8,316,046.

(60) Provisional application No. 61/321,825, filed on Apr. 7, 2010.

(51) Int. Cl.
*G06F 17/30* (2006.01)
(52) U.S. Cl.
USPC .............. 707/721; 707/729; 707/769; 705/35
(58) Field of Classification Search
USPC .............................. 707/721, 729, 769; 705/35
See application file for complete search history.

(56) References Cited

U.S. PATENT DOCUMENTS

| 8,295,898 | B2 * | 10/2012 | Ashfield et al. ............ 455/575.6 |
| 2004/0135904 | A1 | 7/2004 | Shiota et al. |
| 2004/0235450 | A1 * | 11/2004 | Rosenberg .................... 455/406 |
| 2006/0219774 | A1 | 10/2006 | Benco et al. |
| 2007/0281690 | A1 * | 12/2007 | Altman et al. ............. 455/435.1 |
| 2008/0132251 | A1 | 6/2008 | Altman et al. |
| 2009/0023428 | A1 | 1/2009 | Behzad et al. |
| 2009/0089342 | A1 | 4/2009 | Runstedler et al. |
| 2009/0106778 | A1 | 4/2009 | Pomeroy et al. |
| 2009/0204899 | A1 | 8/2009 | Bennett |
| 2010/0029294 | A1 | 2/2010 | Matsuoka |
| 2010/0131367 | A1 * | 5/2010 | Sun ........................... 705/14.58 |
| 2010/0175001 | A1 | 7/2010 | Lazarus et al. |
| 2010/0223165 | A1 * | 9/2010 | Calman et al. ................. 705/30 |

* cited by examiner

*Primary Examiner* — Baoquoc N To
*Assistant Examiner* — Andalib Lodhi
(74) *Attorney, Agent, or Firm* — Fish & Richardson P.C.

(57) ABSTRACT

A journaling subsystem on a mobile device stores event data related to applications or other subsystems running on the mobile device. The event data can be stored and indexed in a journal database so that a timeline of past events can be reconstructed in response to search queries. In some implementations, a timeline can be reconstructed with markers on a map display based on search results. When the user interacts with a marker on the map display, the event data collected by the mobile device is made available to the user.

18 Claims, 7 Drawing Sheets

JOURNALING ON MOBILE DEVICES

CROSS-REFERENCE TO RELATED APPLICATIONS

This application is a continuation of U.S. patent application Ser. No. 12/892,913, filed on Sep. 28, 2010, which claims priority benefit of U.S. Provisional Application Ser. No. 61/321,825, filed on Apr. 7, 2010, all of which are incorporated by reference in their entirety.

TECHNICAL FIELD

This subject matter is related generally to data collection and processing on mobile devices.

BACKGROUND

Modern mobile devices, such as a smart phone, can include a variety of applications. Some examples of applications include but are not limited to: a map or navigation service, digital photography, a media player, telephony, email, text messaging, a web browser, an address book, a voice memo recorder, and many other useful applications. A typical user may use one or more of these applications many times a day. These applications can capture, generate and receive information, which can then be stored or communicated to other devices.

To support these applications, a modern mobile device can have a variety of subsystems, including but not limited to: a camera subsystem, a wireless communications subsystem (e.g., WiFi, 3G, Bluetooth), a radio broadcast receiver (e.g., FM stereo receiver), an audio/video subsystem, a power management subsystem, a geographic positioning device (e.g., a GPS receiver), a stereo receiver, a memory subsystem, motion sensors (e.g., accelerometer, gyroscope, magnetometer), light sensors, touch sensitive displays and pads, etc.

For many mobile devices, there is no mechanism available for reconstructing past events occurring on the mobile device in a comprehensive manner.

SUMMARY

A journaling subsystem on a mobile device stores event data related to applications or other subsystems running on the mobile device. The event data can be stored and indexed in a journal database so that a timeline of past events can be reconstructed in response to search queries. In some implementations, a timeline can be reconstructed with markers on a map display based on search results. When the user interacts with a marker on the map display, the event data collected by the mobile device is made available to the user.

The journaling subsystem can be accessed by client applications through an Application Programming Interface (API). The applications can identify events and send related event data through program calls to the journaling subsystem to be stored and indexed either locally on the mobile device or on a network. In some applications, the user can specify the event data to be collected and the journaling subsystem automatically collects the specified information when the journaling subsystem is activated by the user or another application. The journaling subsystem can be activated based on a schedule or in response to a trigger event.

When in active mode, the journaling subsystem can log event data, including but not limited to: network connection/disconnection event data (e.g., connecting to WiFi, Bluetooth, 3G), radio broadcasts event data (e.g., tuning to an FM radio station), application event data (e.g., launch/exit events), power event data (e.g., shutdown, sleep mode, charging), accessory attachment event data (e.g., a thumb drive, microphone or other attachment), communication event data (e.g., telephone calls, text messages, emails), web browsing event data (e.g., browsing history, favorites, bookmarks), transaction event data (e.g., credit card purchases), download event data (e.g., downloaded music, applications).

The information collected by the journaling subsystem can be stored with timestamps and location information (e.g., latitude, longitude, altitude) in a journal database. The journal database can be "personalized" to the user or a group of users. An index can be built that allows the database to be queried by the user or a program using a variety of queries, such as time span queries, event queries, etc. In some implementations, applications can allow the user to annotate the event data before or after it has been stored and/or indexed. The event data can be collected in a local cache storage on the mobile device and uploaded to a network storage device on a scheduled basis or in response to a trigger event. In some implementations, the location information can be geo-coded into a point of interest (POI). The location information and/or information of the POI can be associated with an entry of the logged event data. The uploads can be incremental.

A web service, or a local application program, or both, can be provided that allows users to manage the journal database, such as defining categories for the journal, specifying desired location based services (LBS) or editing journal entries. In some implementations, the journal database can be shared with others and used to target location based services and the delivery of content to user.

DETAILED DESCRIPTION

System Overview

Figure 1:
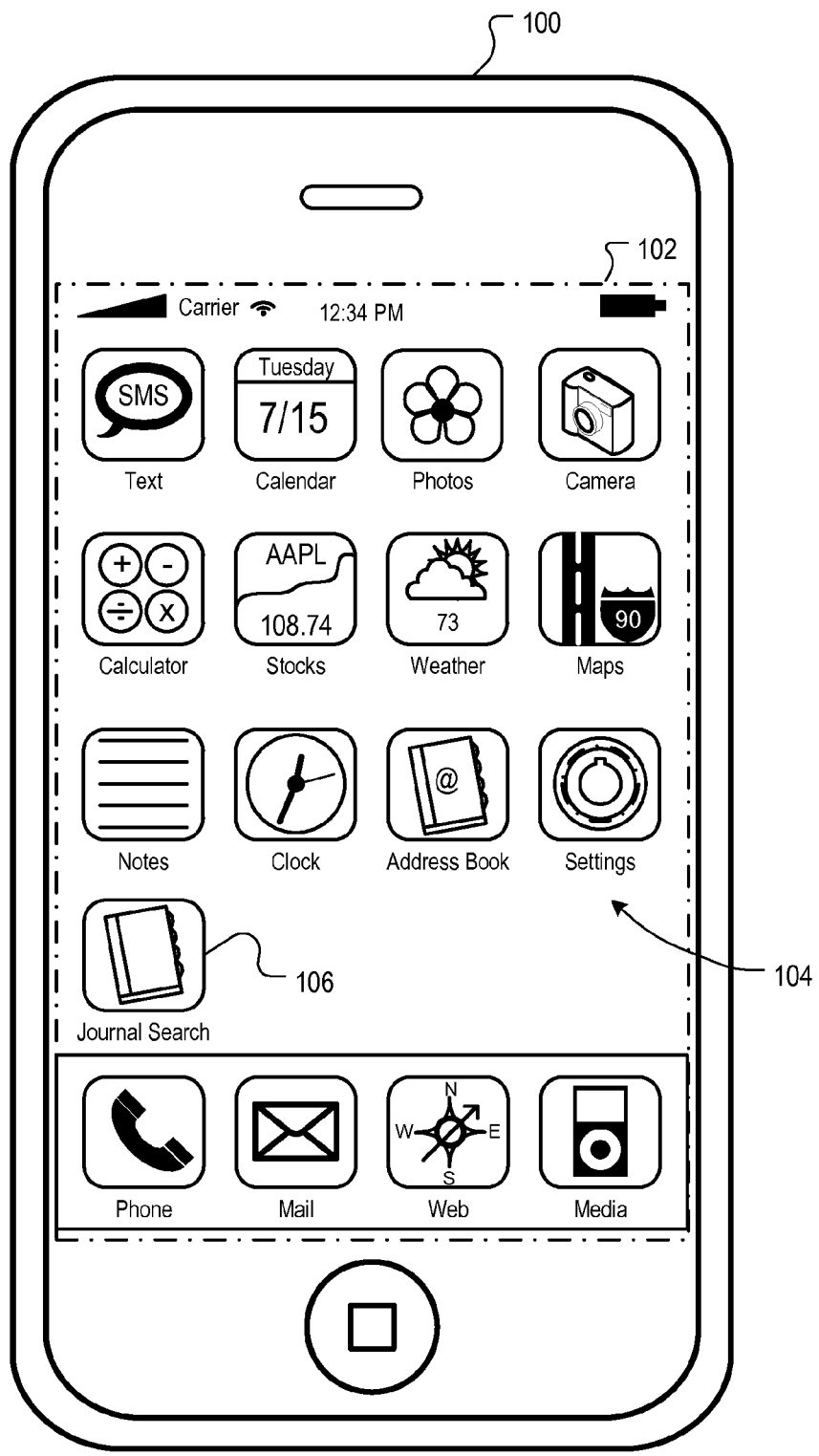
FIG. 1 illustrates an exemplary home screen of a mobile device capable of storing and processing event data.

FIG. 1 illustrates an exemplary home screen 104 of mobile device 100 capable of storing and processing event data. Mobile device 100 can be any device capable of determining its current geographic location by communicating with a positioning system, such as Global Positioning System (GPS), cellular networks, WiFi networks, and any other technology that can be used to provide the actual or estimated location of mobile device 100. Some examples of mobile devices include but are not limited to: a handheld computer, a personal digital assistant, a cellular telephone, a network appliance, a camera, a smart phone, an enhanced general packet radio service (EGPRS) mobile phone, a network base station, a media player, a navigation device, an email device, a game console, an electronic tablet, or a combination of any two or more of these data processing devices or other data processing devices.

In some implementations, mobile device 100 can include a touch sensitive display 102 or touch pad that can receive touch input and gestures. In the example shown, home screen 104 can include a number of icons that can be touched by a user to invoke an application. For example, if the user touches icon 106, a journal search application can be invoked and a search interface can be displayed, a shown in FIG. 2.

Exemplary Interfaces

Figure 2:
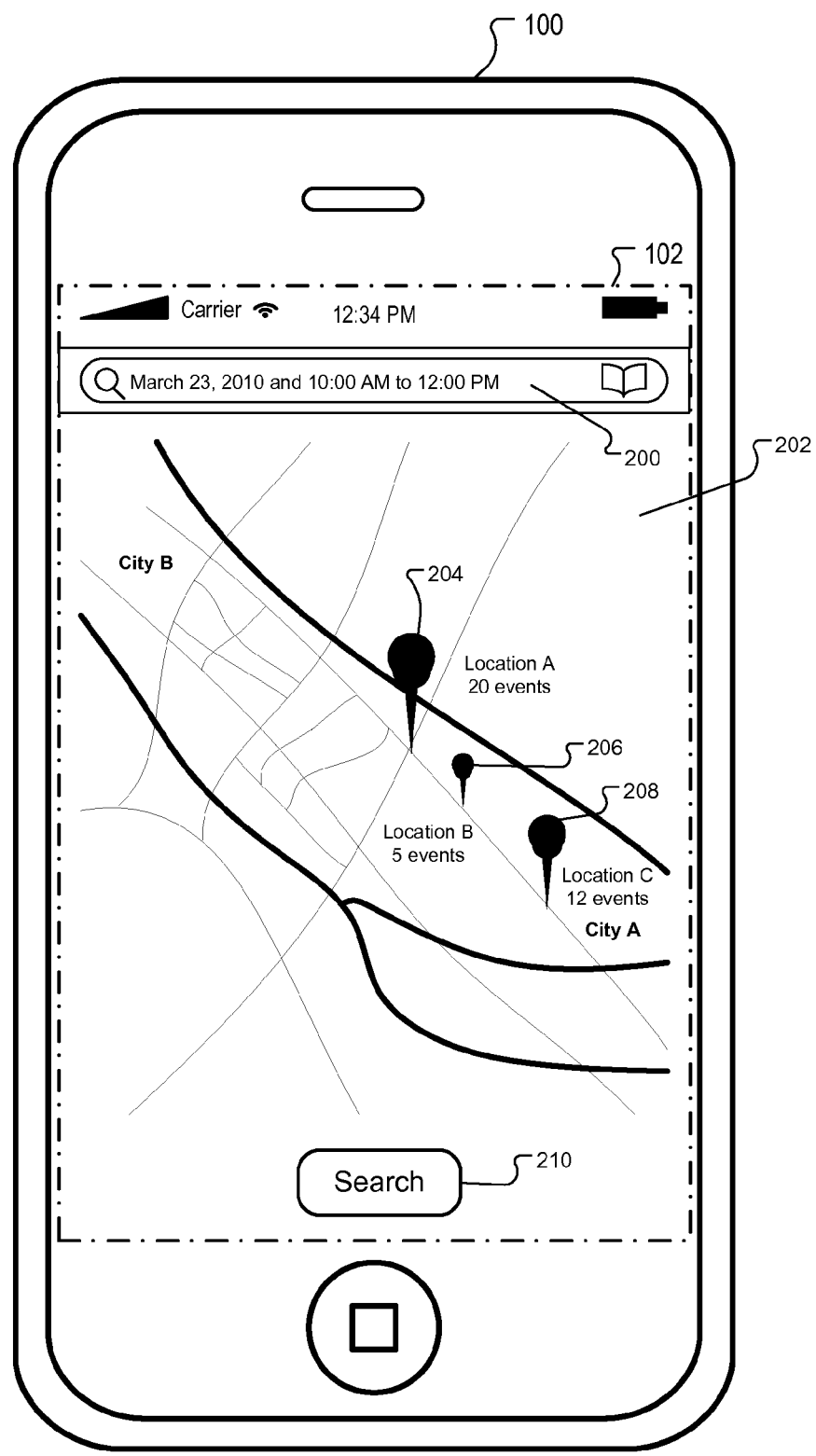
FIG. 2 illustrates an exemplary search interface for a mobile device, including a map display for displaying event locations.

FIG. 2 illustrates an exemplary search interface 202 for mobile device 100, including a map display for displaying event locations (e.g., event locations indicated by markers 204, 206 and 208). Search interface 202 can include search box 200, which a user can use to enter a search query for a journal database. In the example shown, the user entered the date/time span query "Mar. 23, 2010 and 10:00 AM-12:00 PM." The term "and" can be a Boolean operator as conventionally used in search engine queries, and the term "to" can specify a time span. This example query is requesting a search for event data for Mar. 23, 2010 between the hours of 10:00 AM to 12:00 PM. Other queries could also be used to search for event data, including Boolean operators and keywords. For example, if the user only wanted to search for emails, the user could use the Boolean operator "and" to narrow the search. Such a query may be constructed as "Mar. 23, 2010 and 10:00 AM to 12:00 PM and email." After constructing a query in search box 200, the user can select a "Search" button 210 to begin a search for event data within the scope of the query.

Generally, "event data" can be any data associated with an event related to mobile device 100. There can be events associated with applications running on mobile device 100 and events associated with subsystems of mobile device 100. Applications running on mobile device 100 can identify events and send related event data through program calls to a journaling subsystem of mobile device 100. The journaling subsystem can store and index the event data locally on mobile device 100 and/or on a network. In some applications, the user of mobile device 100 can specify the event data to be collected in a user interface presented on mobile device 100. For example, the user can invoke the user interface by a selecting button or other user interface element (not shown). In the user interface (not shown), as user can select the types of event data the user would like to collect and store for future searches. In some implementations, the user interface can provide check boxes for making event data selections. Other user interfaces are also possible. The event data can be related to applications and other subsystems on mobile device 100 (e.g., a wireless subsystem, a telephony subsystem). In some implementations, a developer can select the event data to be collected through an API program call.

The journaling subsystem can automatically collect the specified event data whenever the journaling subsystem is activated by the user or another application. The journaling subsystem can be activated based on a schedule or in response to a trigger event. When in active mode, the journaling subsystem can log event data, including but not limited to: network connection/disconnection event data (e.g., connecting to WiFi, Bluetooth, 3G), radio broadcasts event data (e.g., tuning to an FM radio station), application event data (e.g., launch/exit events), power event data (e.g., shutdown, sleep mode, charging), accessory attachment event data (e.g., a thumb drive, microphone or other attachment), communication event data (e.g., telephone calls, text messages, emails), web browsing data (e.g., browsing history, favorites, bookmarks). In some implementations, the journaling subsystem can be run in a low power mode using a low power processor to conserve power on mobile device 100.

The event data that is collected can have a timestamp and also be associated with a geographic location or region where the event data was collected. The event data can be associated with a POI that is in proximity with the location where the event data was collected. The POI can be created on mobile device 100 by a user, or downloaded to mobile device 100 from a remote server. Accordingly, a database can be built where data is stored for a particular geographic location and time or time span. The event data can be stored in a journal database and an index (e.g., an inverted index) can be updated to allow the event data to be searched based on time, location, event data type or any other desired search query terms. The event data can be stored local to mobile device 100 or on a network. In some implementations, the event data can be stored temporarily in a local cache of mobile device 100 and uploaded to a network on a scheduled basis or in response to a trigger event.

Referring again to FIG. 2, an example scenario will now be described. In this example scenario, the user selected icon 106 on home screen 104, which resulted in search interface 202 being displayed on touch sensitive display 102. A map is displayed with markers 204, 206, 208, corresponding to locations where event data was collected on Mar. 23, 2010 in the time span 10:00 AM to 12:00 PM. To avoid clutter from too many markers, only markers where a threshold number of events have occurred are displayed. In this implementation, the size of the marker visually indicated the amount of event data logged or collected at the marked location. Additionally, text is displayed providing a name for the location and the number of events logged.

In this example, marker 204 indicated that 20 events were logged at location A, marker 206 indicates that 5 events were logged at location B and marker 208 indicated that 12 events were logged at location C. As shown, marker 204 is larger than markers 206 and 208 and marker 208 is larger than marker 206, based on the number of events logged at those respective locations.

In some implementations, the journaling subsystem can aggregate events logged at different locations and times under a single marker to reduce screen clutter. The events having locations with a predetermined distance of one another can be clustered into an event group and designated by a single marker. A similar filter can be used for timestamps. For example, a user can take digital photos with mobile device 100 at various locations in a park. Each picture would be logged as a separate event and have a separate corresponding location and timestamp. The location can be determined by an onboard position system, such as GPS and added to the photo's metadata. The time can be taken from an onboard clock. The journaling subsystem can use location and time to determine major events (having N number of individual events in close proximity) and generate markers for a map display for only those major events. N can be selected by a user through a user interface or an application developer through an API. In addition to markers, a route traversed by mobile device 100 can be reconstructed based on location data and displayed on the map.

The user can access individual event data by touching or otherwise interacting with a marker. In this example, the user has touched marker 204, resulting in the user interface 302 being displayed, as shown in FIG. 3.

Figure 3:
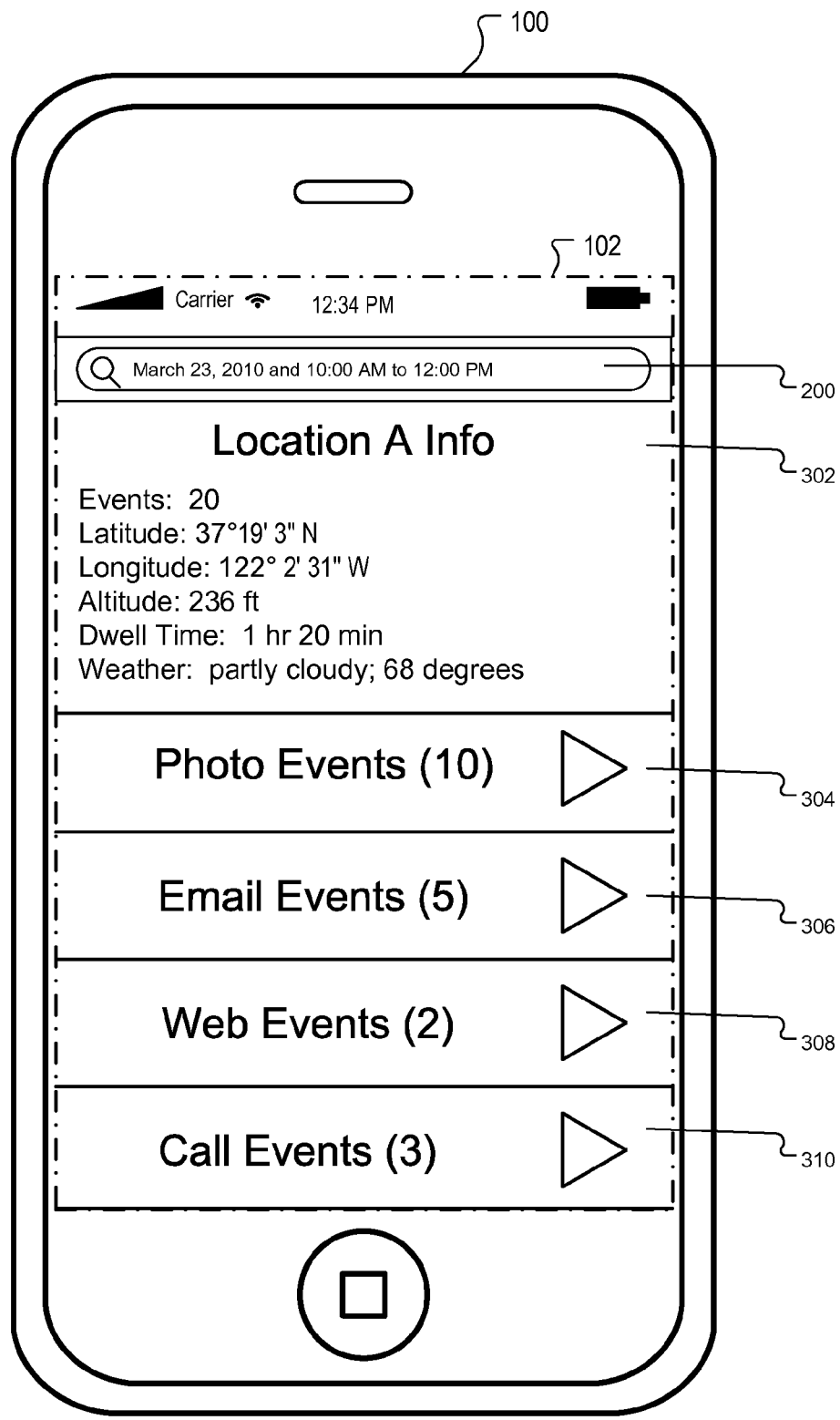
FIG. 3 illustrates an exemplary interface for displaying search results.

FIG. 3 illustrates an exemplary interface 302 for displaying search results. In this example, marker 204 corresponding to 20 events logged at Location A was selected by the user from search interface 202. Interface 302 can include an information section for displaying information about Location A. Some examples of information are position coordinates, dwell time (total elapsed time at Location A), weather, and one or more POIs that are located at or near location A. The POIs can be stored locally on mobile device 100 or remotely on a server. Other information can also be displayed based on the application.

The journaling subsystem used the search query to identify three major events. The locations of those events were Location A, Location B and Location C. The journaling subsystem identified 20 events that took place at Location A during the time span specified in the search query. The 20 Location A events include 10 photo events, 5 email events, 2 Web events and 2 call events. Interface 302 displays user interface elements 304, 306, 308 and 310 for the photo, email, Web and call events, respectively. The number user interface elements depends on the number of different types of events logged at Location A and/or as specified by keywords in the search query. For example, if the user added to the query in search box 200 the term " . . . and photo", then only a user interface element 304 would be displayed, as that is the only event data that is of interest to the user based on the query.

The individual events can be accessed by selecting the corresponding user interface elements. Badges can be added to user interface elements to indicate the number of events out of the total number of events that is associated with a particular event type. For example, there are 10 photo events. If the user selects user interface element 304, a grid view of 10 digital photos captured by a camera subsystem of mobile device 100 during the major event at Location A is displayed. In some implementations, selection of user interface element 304 invokes a photo editing application residing on mobile device 100. The photo editing application can be automatically populated with the digital images for immediate editing.

Similarly, selection of user interface element 306 will result in a list of emails sent or received during the major event at Location A. The user can select the emails to read the contents. If user interface element 308 is selected the user can be provided with a history of Web addresses that were browsed during the major event at Location A. Transactions (e.g., credit card purchases) made through websites can also be logged as Web events. If user interface element 310 is selected, the user can be provided with a call log of all calls placed or received during the major event at Location A.

In some implementations, mobile device 100 does not store the actual event data. Rather metadata can be locally stored for use in generating the Location A information and user interface elements 304, 306, 308 and 310. When the user selects a particular user interface element, the journaling subsystem can make request for the event data from a network service, such as service 570, described in reference to FIG. 5.

In some implementations, a web service, or an application program local to the mobile device, can be provided that allows users to manage the journal database through web pages served by the web service or the location application program, such as defining categories for the journal, specifying desired location based services (LBS) or editing journal entries. In some implementations, the journal database can be shared with others and used to target location based services and the delivery of content to user. The web service or application program can additionally or alternatively be used to complement or enhance entries of the journal, including, for example, adding more metadata (e.g., date, title, category) to a journal entry.

Exemplary Processes

Figure 4A:
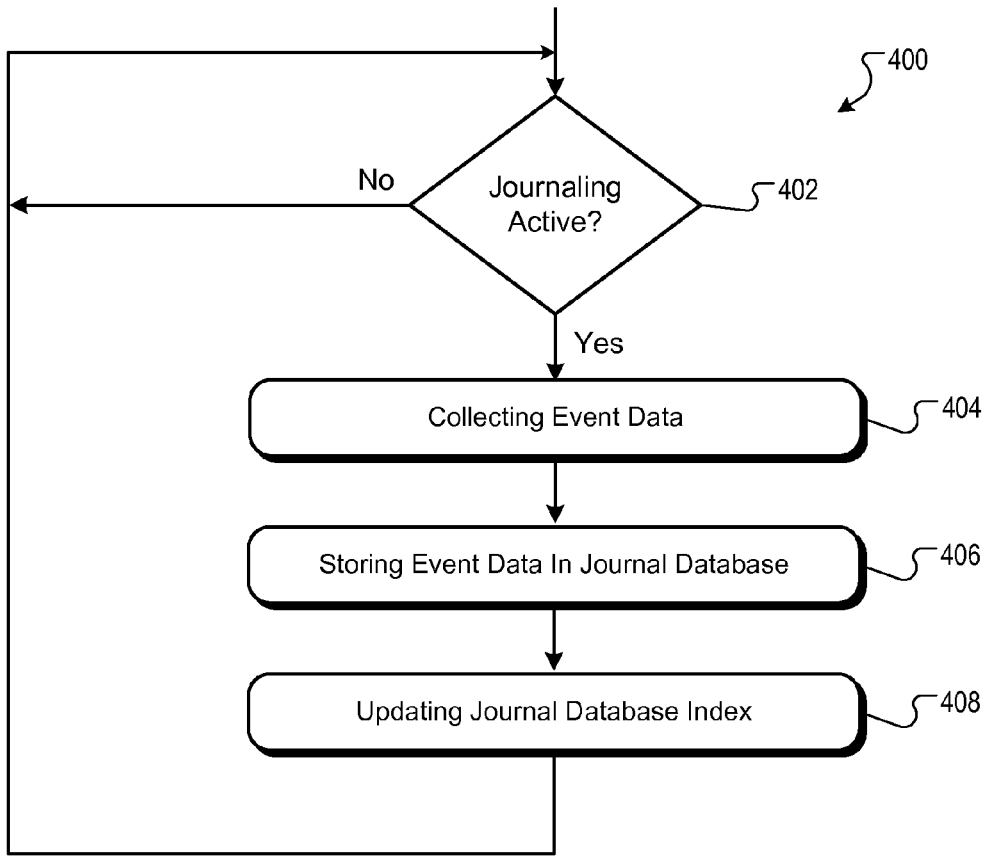
FIG. 4A is a flow diagram of an exemplary process for collecting event data on the mobile device of FIG. 1.

FIG. 4A is a flow diagram of an exemplary process 400 for collecting journal event data with the mobile device of FIG. 1. In some implementations, process 400 can begin when a journaling subsystem on a mobile device becomes active (402). The journaling subsystem can be activated by an application through an API, remotely through a network connection, by a user through a user interface or by an operating system. When active, the journaling subsystem collects or logs event data (404). In some scenarios, an application or subsystem sends event data to the journaling subsystem. The event data can be tagged by the applications or subsystems to indicate the type of event (e.g., email, text, photos). The applications, subsystems or an operating system of the mobile device can provide a timestamp and location corresponding to the event data. The journaling subsystem can use the timestamp, location and tags to store the event data in a journal database (406). The tags can be the same as keywords used in the search query. An index for the database can be updated with the new event data entries (408).

Figure 4B:
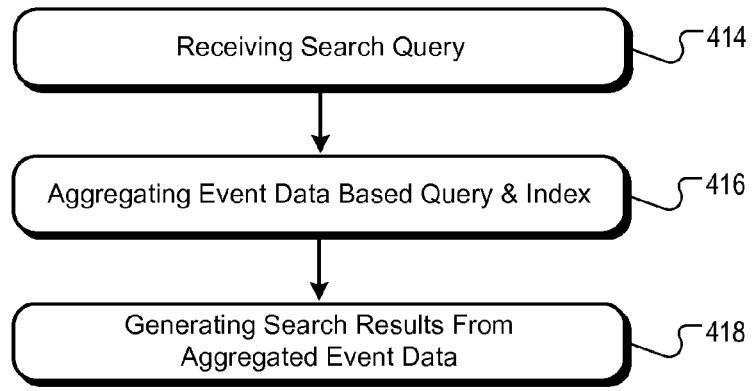
FIG. 4B is a flow diagram of an exemplary process for searching event data collected as described in reference to FIG. 4A.

FIG. 4B is a flow diagram of an exemplary process 412 for searching the journal event data collected as described in reference to FIG. 4A. In some implementations, the journaling subsystem receives a search query (414). The search query can be parsed and the query terms can be used with an index to aggregate event data (416) stored in the journaling database. Search results can be generated from the aggregated event data (418). For example, the journaling subsystem can determine major events as described in reference to FIG. 3 and generate markers for same for display on a map display of the mobile device.

Figure 4C:
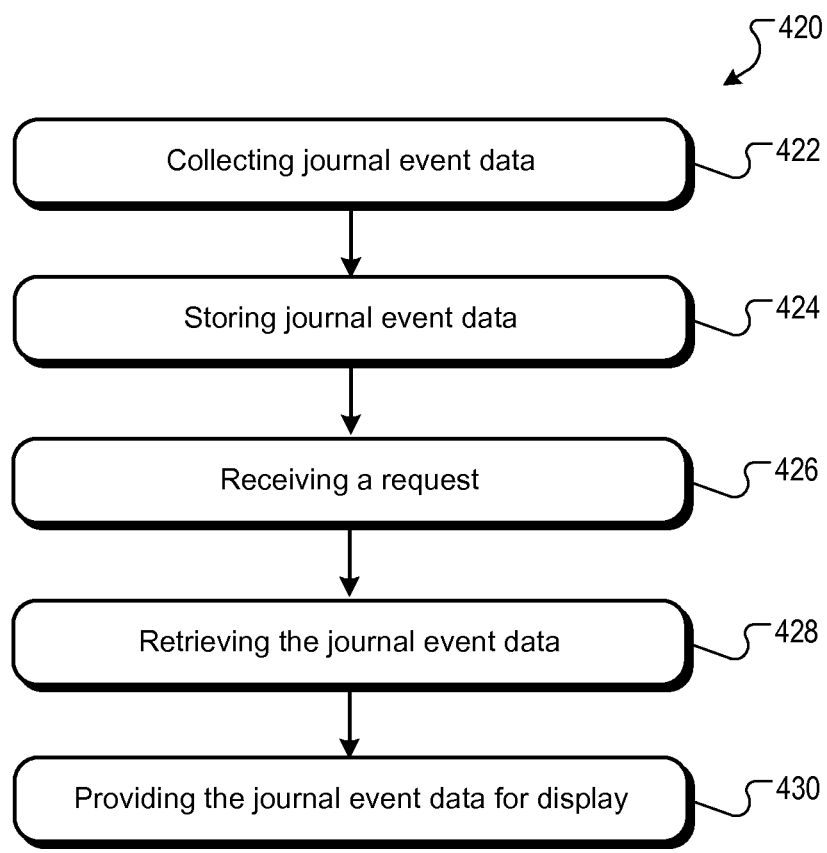
FIG. 4C is a flow diagram of an exemplary process for collecting and presenting event data as described in reference to FIGS. 4A and 4B.

FIG. 4C is a flow diagram of exemplary process 420 for collecting and presenting event data as described in reference to FIGS. 4A and 4B. A processor of a mobile device can be configured to collect (422) journal event data over a time span. The processor can be configured to automatically collect at least one of network connection event data, radio broadcast event data, power event data, accessory attachment event data, communication event data, web browsing event data, transaction event data, and download event data. The processor can be configured to automatically record a timestamp and location information of each event, the timestamp corresponding to a time the event occurred, the location information corresponding to a location at which the event occurred. The processor can be configured to automatically collect journal event data at different locations when the locations are within a threshold distance of each other, collect the journal event data periodically at a specified time interval, collect the journal event data when a threshold number of events occur, or collect the journal event data at a specified location.

The mobile device can store (424) the journal event data and corresponding timestamps in a database. Storing the journal event data and corresponding timestamps in the database can include storing the journal event data and corresponding timestamps in association with the location information. In some implementations, storing the journal event data and corresponding timestamps in the database can include identifying a point of interest that is located within a threshold distance of the location where the event occurred. The point of interest can be associated with the event.

The mobile device can receive (426) a request for journal event data. The request can include a specification of a time, a time period, a location, or an area. The request can include an input from a touch screen device.

The mobile device can retrieve (428) the requested journal event data from the database in response to the request. Retrieving the requested journal event data from the database includes retrieving the requested journal event data in response to at least one of a specified location or a specified time, the specified location and specified time being associated with the request.

The mobile device can provide (430) the journal event data for display on the mobile device. Providing the journal event data for display includes providing for display one or more events in association with a location upon a user selection of the location.

In some implementations, exemplary process 420 can include personalizing the database for a user or a group of users. Exemplary process 420 can include receiving annotation information to annotate the journal event data, and annotating the journal event data using the annotation information. Exemplary process 420 can include aggregating events logged at different locations and times when the different locations are located within a specified distance to each other, at specified time intervals, when a threshold number of events occur, or when the mobile device is located at a specific location. The aggregated events can be associated with a marker. The marker can be configured to receive an input selecting the aggregated events.

Exemplary Network Operating Environment

Figure 5:
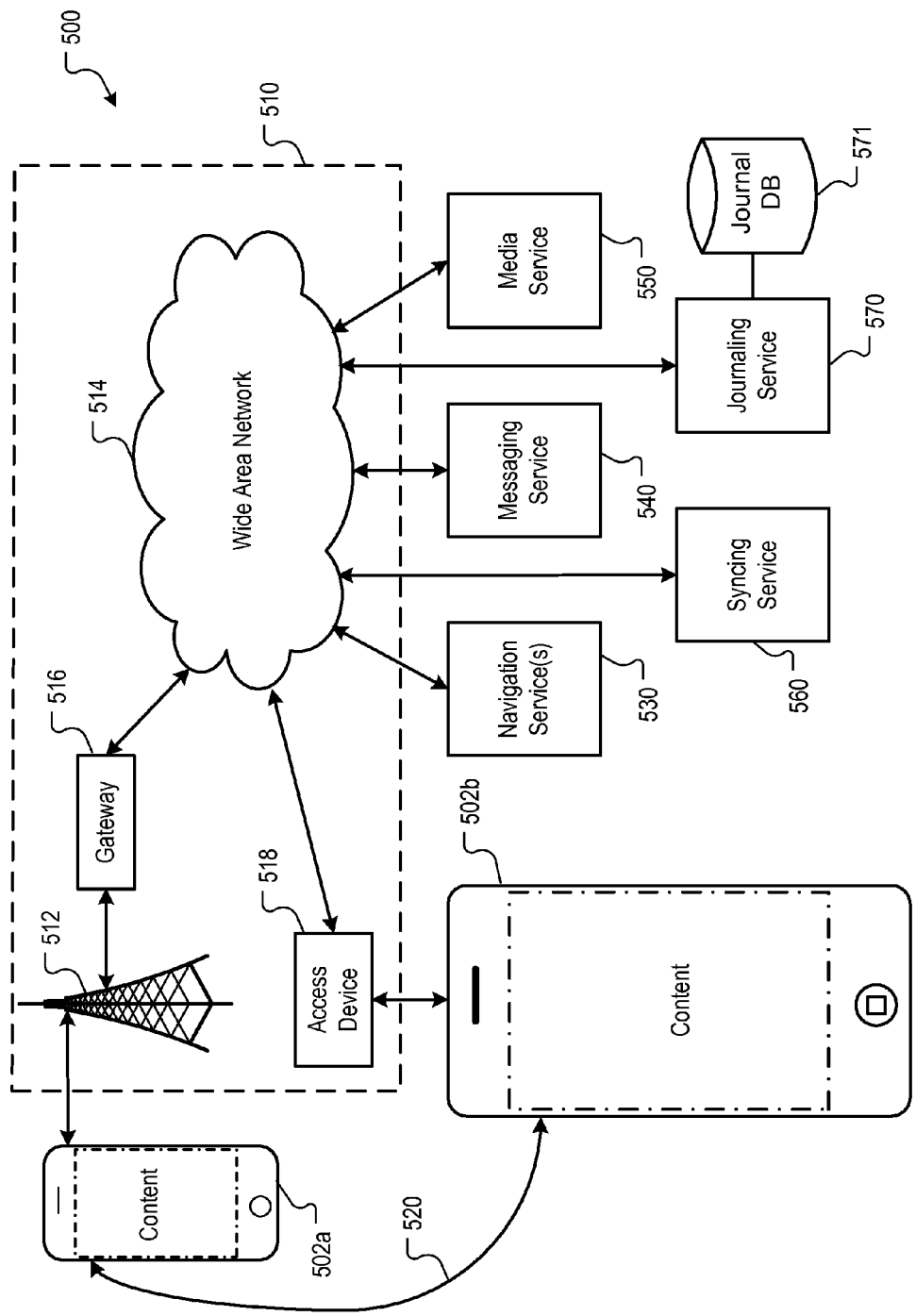
FIG. 5 is a block diagram of an example network operating environment for the mobile device of FIG. 1.

FIG. 5 is a block diagram of an example network operating environment 500 for mobile device 100 of FIG. 1. In FIG. 5, mobile devices 502a and 502b each can represent mobile device 100. Devices 502a and 502b can, for example, communicate over one or more wired and/or wireless networks 510. For example, wireless network 512, e.g., a cellular network, can communicate with wide area network (WAN) 514, such as the Internet, by use of gateway 516. Likewise, access device 518, such as an 802.11g wireless access device, can provide communication access to wide area network 514. In some implementations, both voice and data communications can be established over wireless network 512 and access device 518. For example, device 502a can place and receive phone calls (e.g., using VoIP protocols), send and receive e-mail messages (e.g., using POP3 protocol), and retrieve electronic documents and/or streams, such as web pages, photographs, and videos, over wireless network 512, gateway 516, and wide area network 514 (e.g., using TCP/IP or UDP protocols). Likewise, in some implementations, device 502b can place and receive phone calls, send and receive e-mail messages, and retrieve electronic documents over access device 518 and wide area network 514. In some implementations, device 502a or 502b can be physically connected to access device 518 using one or more cables and access device 518 can be a personal computer. In this configuration, device 502a or 502b can be referred to as a "tethered" device. Connectivity with a wired or wireless network can allow devices to share location histories with each other or with a remote service (e.g., navigation services 530).

Devices 502a and 502b can also establish communications by other means. For example, wireless device 502a can communicate with other wireless devices, e.g., other devices 502a or 502b, cell phones, etc., over wireless network 512. Likewise, devices 502a and 502b can establish peer-to-peer communications 520, e.g., a personal area network, by use of one or more communication subsystems, such as the Bluetooth™ communication devices. Other communication protocols and topologies can also be implemented.

Device 502a or 502b can, for example, communicate with one or more services 530, 540, 550, 560, and 570 over one or more wired and/or wireless networks 510. For example, one or more navigation services 530 can provide navigation information, e.g., map information, location information, route information, and other information, to device 502a or 502b. A user of device 502b can invoke a map functionality by pressing a maps icon on a top-level graphical user interface, such as home screen 102 shown in FIG. 1, and can request and receive a map for a particular location, request and receive route directions, or request and receive listings of businesses in the vicinity of a particular location, for example.

Navigation services 530 can receive transmitter IDs, perform a translation to position coordinates using a reference database and serve map views with markers to the location aware device for display or for other purposes. In some implementations, navigation service 530 can provide an online facility (e.g., a Web site) for users to share location histories or network information. Navigation service 530 can use the transmitter IDs to update or improve the accuracy of the reference database.

Messaging service 540 can, for example, provide e-mail and/or other messaging services. Media service 550 can, for example, provide access to media files, such as song files, audio books, movie files, video clips, and other media data. In some implementations, separate audio and video services (not shown) can provide access to the respective types of media files. Syncing service 560 can, for example, perform syncing services (e.g., sync files). Journaling service 570 can, for example, perform journaling services for device 502a or 502b, as described in reference to FIGS. 1-4. Other services can also be provided, including a software update service that automatically determines whether software updates exist for software on device 502a or 502b, then downloads the software updates to device 502a or 502b where the software updates can be manually or automatically unpacked and/or installed. Journal database 571 can store journal event data.

Device 502a or 502b can also access other data and content over one or more wired and/or wireless networks 510. For example, content publishers, such as news sites, RSS feeds, web sites, blogs, social networking sites, developer networks, etc., can be accessed by device 502a or 502b. Such access can be provided by invocation of a web browsing function or application (e.g., a browser) in response to a user touching, for example, a Web object.

Example Mobile Device Architecture

Figure 6:
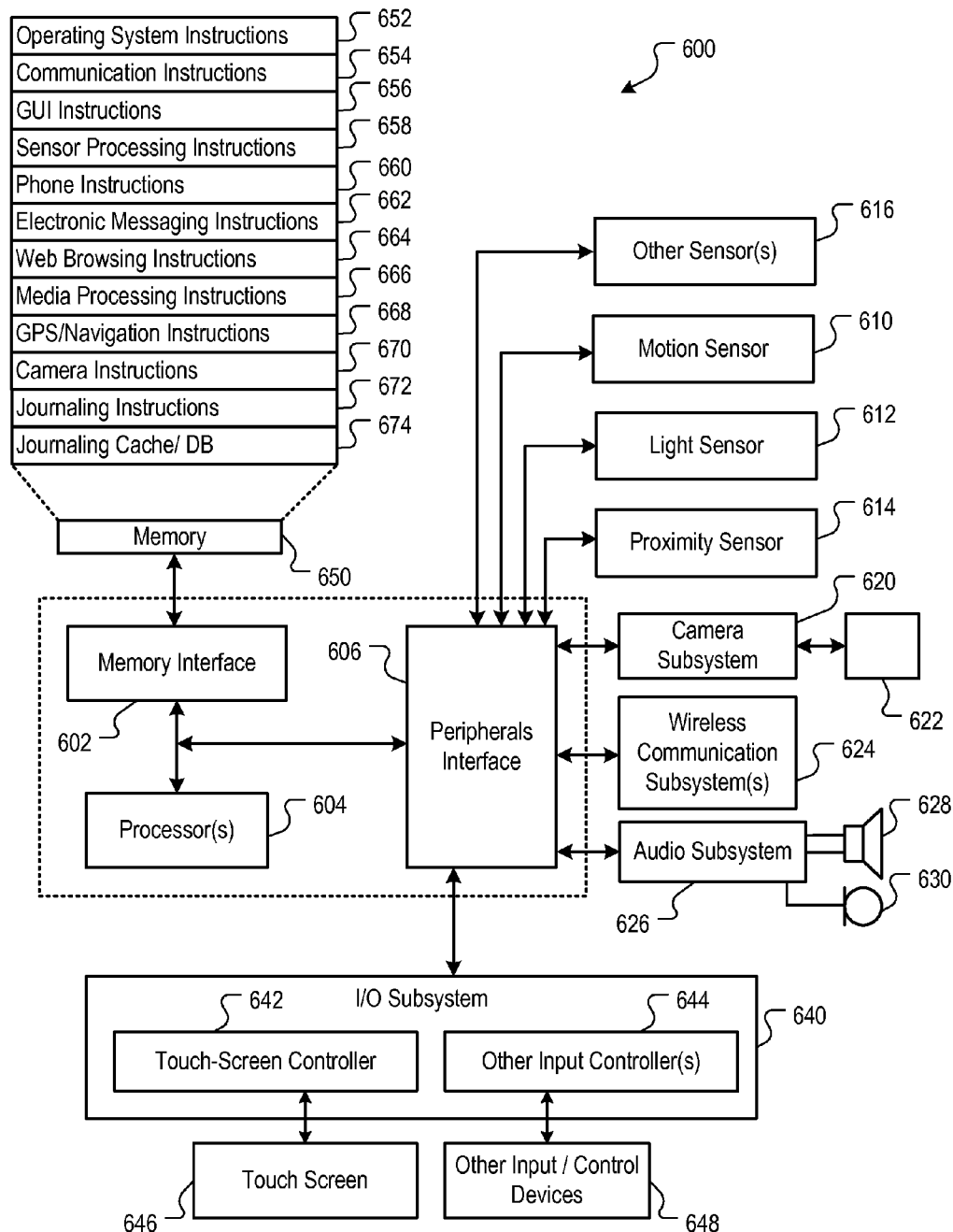
FIG. 6 is a block diagram of an exemplary architecture for the mobile device of FIG. 1.

FIG. 6 is a block diagram of an example architecture 600 of mobile device 100 of FIG. 1. Mobile device 100 can include memory interface 602, one or more data processors, image processors and/or central processing units 604, and peripherals interface 606. Memory interface 602, one or more processors 604 and/or peripherals interface 606 can be separate components or can be integrated in one or more integrated circuits. The various components in mobile device 100 can be coupled by one or more communication buses or signal lines.

Sensors, devices, and subsystems can be coupled to peripherals interface 606 to facilitate multiple functionalities. For example, motion sensor 610, light sensor 612, proximity sensor 614 can be coupled to peripherals interface 606 to facilitate orientation, lighting, and proximity functions. Other sensors 616 can also be connected to peripherals interface 606, such as a positioning system (e.g., GPS receiver), a temperature sensor, a biometric sensor, magnetometer, FM or satellite radio, or other sensing device, to facilitate related functionalities.

Camera subsystem 620 and optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of communication subsystem 624 can depend on the communication network(s) over which mobile device 100 is intended to operate. For example, mobile device 100 may include communication subsystems 624 designed to operate over a GSM network, a GPRS network, an EDGE network, a WiFi or WiMax network, and a Bluetooth™ network. In particular, wireless communication subsystems 624 may include hosting protocols such that device 100 may be configured as a base station for other wireless devices.

Audio subsystem 626 can be coupled to speaker 628 and microphone 630 to facilitate voice-enabled functions, such as voice recognition, voice replication, digital recording, and telephony functions.

I/O subsystem 640 can include touch screen controller 642 and/or other input controller(s) 644. Touch-screen controller 642 can be coupled to touch screen or pad 646. Touch screen 646 and touch screen controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 646.

Other input controller(s) 644 can be coupled to other input/control devices 648, such as one or more buttons, rocker switches, thumb-wheel, infrared port, USB port, and/or a pointer device such as a stylus. One or more buttons (not shown) can include an up/down button for volume control of speaker 628 and/or microphone 630.

In one implementation, a pressing of the button for a first duration may disengage a lock of touch screen 646; and a pressing of the button for a second duration that is longer than the first duration may turn power to mobile device 100 on or off. The user may be able to customize a functionality of one or more of the buttons. Touch screen 646 can, for example, also be used to implement virtual or soft buttons and/or a keyboard. In addition to touch screen 646, mobile device 100 can also include a touch pad.

In some implementations, mobile device 100 can present recorded audio and/or video files, such as MP3, AAC, and MPEG files. In some implementations, mobile device 100 can include the functionality of an MP3 player, such as an iPod™. Mobile device 100 may, therefore, include a connector that is compatible with the iPod™. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store an operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can be a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing, such as described in reference to FIGS. 1-4; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; and journaling instructions 672 to facilitate the features and processed described in reference to FIGS. 1-4. Event data can be stored in journaling cache or database 674. Memory 650 may also store other software instructions (not shown), such as web video instructions to facilitate web video-related processes and functions; and/or web shopping instructions to facilitate web shopping-related processes and functions. In some implementations, media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of mobile device 100 may be implemented in hardware and/or in software, including in one or more signal processing and/or application specific integrated circuits.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of what is disclosed here, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    collecting, by a journaling subsystem of a mobile device, financial transaction data, the financial transaction data including a location of a purchase and a timestamp of the purchase, the journaling subsystem configured to store and index the financial transaction data in a journal database as event data that form a timeline;
    responsive to a request for the timeline, providing for display, in a virtual map, one or more markers representing the timeline, each marker representing an event at a corresponding event time as stored in the event data, at least one of the one or more markers being a transaction marker representing the purchase, the location of the purchase, and, according to the timestamp, a time of the purchase;

in response to a user interaction with the transaction marker, retrieving, by the mobile device, the financial transaction data from the journal database; and providing the financial transaction data for display in the virtual map on the mobile device.

2. The method of claim 1, wherein the purchase is a credit card purchase on the mobile device through a website.

3. The method of claim 1, comprising:
receiving annotation information to annotate the financial transaction data; and
annotating the financial transaction data using the annotation information.

4. The method of claim 1, comprising:
recording the financial transaction data as a Web event.

5. The method of claim 4, comprising:
providing the Web event for display in association with the location of the purchase.

6. The method of claim 1, wherein the purchase is an online purchase through a Web site.

7. A non-transitory storage device storing a computer program product operable to cause one or more processors to perform operations comprising:

collecting, by a journaling subsystem of a mobile device, financial transaction data, the financial transaction data including a location of a purchase and a timestamp of the purchase, the journaling subsystem configured to store and index the financial transaction data in a journal database as event data that form a timeline;

responsive to a request for the timeline, providing for display, in a virtual map, one or more markers representing the timeline, each marker representing an event at a corresponding event time as stored in the event data, at least one of the one or more markers being a transaction marker representing the purchase, the location of the purchase, and, according to the timestamp, a time of the purchase;

in response to a user interaction with the transaction marker, retrieving, by the mobile device, the financial transaction data from the journal database; and providing the financial transaction data for display in the virtual map on the mobile device.

8. The non-transitory storage device of claim 7, wherein the purchase is a credit card purchase on the mobile device through a website.

9. The non-transitory storage device of claim 7, the operations comprising:
receiving annotation information to annotate the financial transaction data; and
annotating the financial transaction data using the annotation information.

10. The non-transitory storage device of claim 7, the operations comprising:
recording the financial transaction data as a Web event.

11. The non-transitory storage device of claim 10, the operations comprising:
providing the Web event for display in association with the location of the purchase.

12. The non-transitory storage device of claim 7, wherein the purchase is an online purchase through a Web site.

13. A system comprising:
one or more processors; and
a non-transitory storage device storing a computer program product operable to cause the one or more processors to perform operations comprising:

collecting, by a journaling subsystem of a mobile device, financial transaction data, the financial transaction data including a location of a purchase and a timestamp of the purchase, the journaling subsystem configured to store and index the financial transaction data in a journal database as event data that form a timeline;

responsive to a request for the timeline, providing for display, in a virtual map, one or more markers representing the timeline, each marker representing an event at a corresponding event time as stored in the event data, at least one of the one or more markers being a transaction marker representing the purchase, the location of the purchase, and, according to the timestamp, a time of the purchase;

in response to a user interaction with the transaction marker, retrieving, by the mobile device, the financial transaction data from the journal database; and providing the financial transaction data for display in the virtual map on the mobile device at the location of the purchase.

14. The system of claim 13, wherein the purchase is a credit card purchase on the mobile device through a website.

15. The system of claim 13, the operations comprising:
receiving annotation information to annotate the financial transaction data; and
annotating the financial transaction data using the annotation information.

16. The system of claim 13, the operations comprising:
recording the financial transaction data as a Web event.

17. The system of claim 16, the operations comprising:
providing the Web event for display in association with the location of the purchase.

18. The system of claim 13, wherein the purchase is an online purchase through a Web site.

* * * * *